A. M. ECHTERNACH.
AUTOMATIC SPEED SIGNAL DEVICE.
APPLICATION FILED JAN. 11, 1921.

1,433,989.  Patented Oct. 31, 1922.
4 SHEETS—SHEET 1.

A. M. Echternach, INVENTOR.

BY J. P. Gorin, ATTORNEY.

mark thereon. As soon as the pressure upon the push button is relieved, the arm will be returned to its normally inoperative position.

While I have illustrated and described my invention in connection with certain preferred embodiments thereof, it will be understood that I do not intend to limit myself to the specific embodiments shown, but that I intend to cover my invention broadly, in whatever form its principles may be employed.

Having thus described my invention, I claim:—

1. In a recording instrument, a chart, automatic means for producing on said chart a continuous record of the variations of a variable factor, and manually operable means forming part of said instrument for making periodically an additional record on said chart.

2. In a recording instrument, a casing, a driven chart within said casing, automatic means for producing on said chart a continuous record of the variations of a variable factor, and manually operable means forming part of said instrument for making periodically an additional record on said chart.

3. In a recording instrument, a casing having a window, a driven chart visible through said window, automatic means for producing on said chart a continuous record of the variations of a variable factor, and manually operable means forming part of said instrument and operable from without said casing for making periodically an addition-record on said chart.

4. In a recording instrument, a casing having a window, a driven chart visible through said window, automatic means for producing on said chart a continuous record of the variations of a variable factor, auxiliary chart marking means arranged within said casing and normally out of engagement with said chart, and manually operable means without said casing for actuating said auxiliary chart marking means.

5. In a recording instrument, a casing, a glass cover plate therefor, a driven chart visible through said cover plate, automatic means for producing on said chart a continuous record of the variations of a variable factor, and manually operable means carried by said cover plate for making periodically an additional record on said chart.

6. In a recording instrument, a casing, a glass cover plate therefor, a driven chart visible through said cover plate, automatic means for producing on said chart a continuous record of the variations of a variable factor, a reciprocatable button carried by said cover plate and extending therethrough, and chart marking means normally out of engagement with said chart and adapted to be forced into engagement with said chart by the depressing of said button.

7. In a recording instrument, the combination of a chart, means for producing a continuous record thereon indicative of certain conditions to which the instrument is responsive, and chart-marking means adapted to be actuated by an observer of the instrument to produce a record thereon indicative of the number of observations taken by the observer during the production of the continuous record.

8. In a recording instrument, the combination of a uniformly movable chart provided with divisions indicative of successive uniform intervals of time, means for producing a continuous record upon the chart indicative of certain conditions to which the instrument is responsive, and chart marking means adapted to be actuated by an observer of the instrument to produce marks upon the chart at successive intervals of time, said marks serving in connection with the time divisions of the chart to show at what times the observer took observations of the continuous record.

9. In a recording instrument, a chart, markings thereon for indicating intervals of time, automatic means responsive to the variations of a factor for producing a record on said chart, and manually operable means for producing an additional record on said chart.

10. In combination, a chart, a record thereon showing the chronological variation of a variable factor, and a second record thereon showing the times when an attendant took notice of said variable factor.

11. The method herein described, which consists in providing on a chart showing the changes of a variable factor, a record showing the periods of time when an attendant took notice of said variable factor.

12. The method of recording the attendance of an operator to an instrument recording chronologically the variations of a factor, which consists in providing on a chart on which said variations are being recorded, a record of the times when said operator attended to said instrument.

13. In an instrument for recording the variation of a factor and the periodic observation of the record thus produced by a watchman, means for recording the variations of said factor, and means responsive to an act of the watchman for recording the time of actuation thereof.

14. In an instrument of the character described, means for recording the chronological variations of a variable factor, and means responsive to an act of an attendant for recording the time of actuation thereof by said attendant.

15. In a recording instrument, a normally

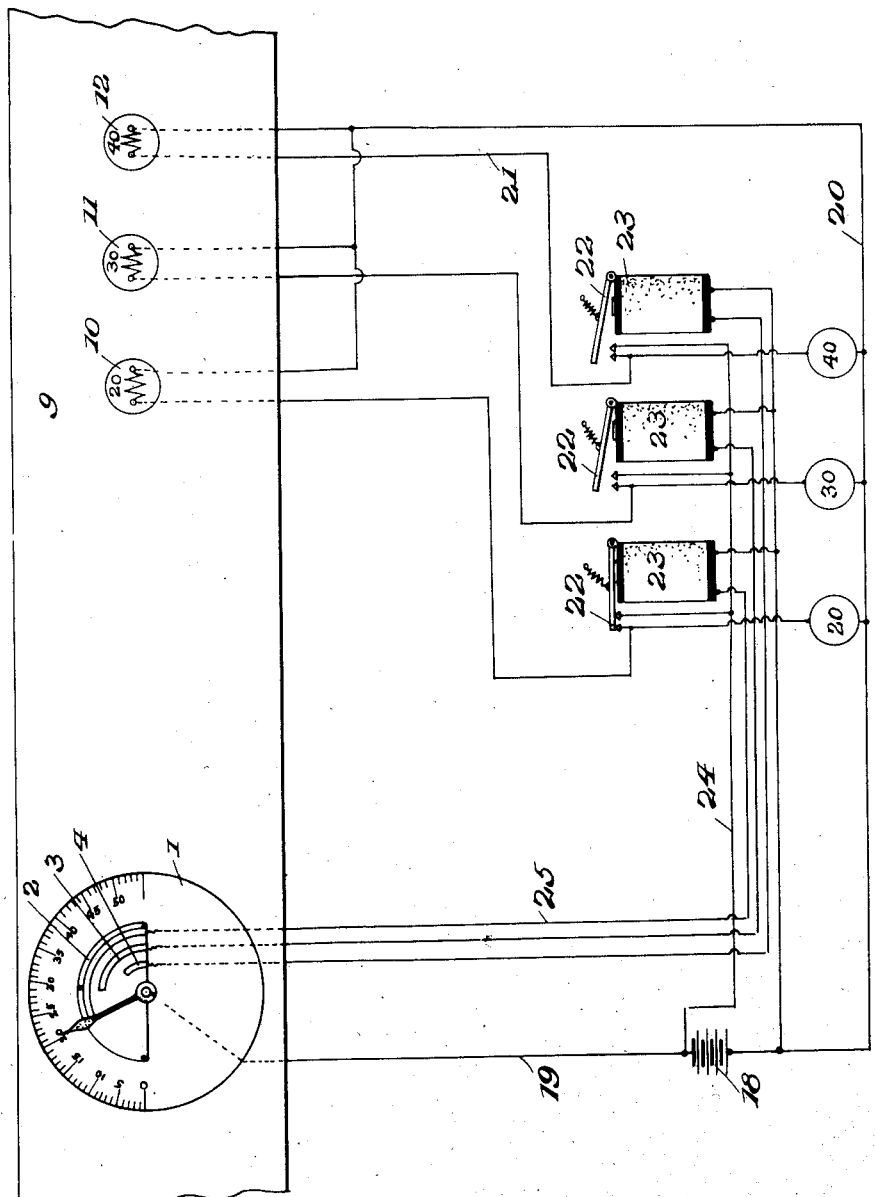

A. M. ECHTERNACH.
AUTOMATIC SPEED SIGNAL DEVICE.
APPLICATION FILED JAN. 11, 1921.
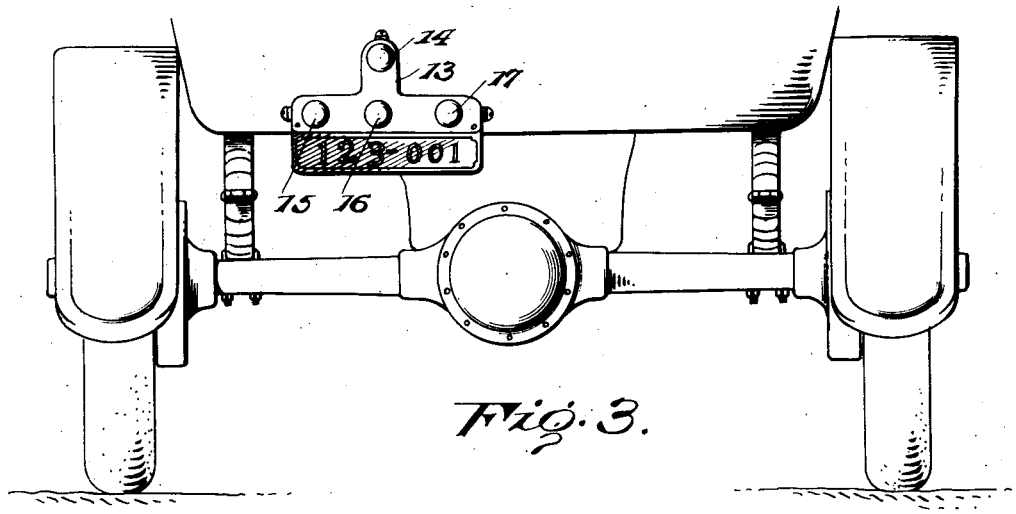
Fig. 3.
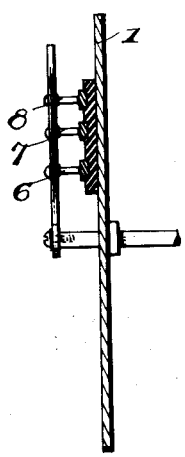
Fig. 4.
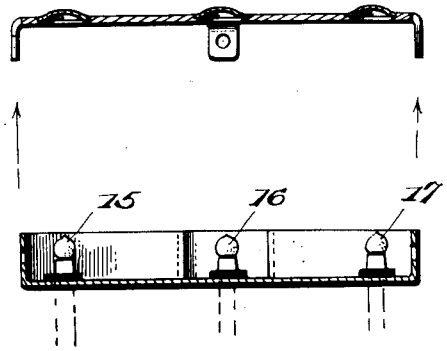
Fig. 5.
Fig. 6.
A. M. Echternach, INVENTOR.
BY F. P. Gorin, ATTORNEY.

A. M. ECHTERNACH.
AUTOMATIC SPEED SIGNAL DEVICE.
APPLICATION FILED JAN. 11, 1921.

1,433,989.

Patented Oct. 31, 1922.
4 SHEETS—SHEET 4.

A. M. Echternach, INVENTOR.

BY F. P. Yorin, ATTORNEY.

Patented Oct. 31, 1922.

1,433,989

UNITED STATES PATENT OFFICE.

ARTHUR M. ECHTERNACH, OF SEATTLE, WASHINGTON.

AUTOMATIC SPEED-SIGNAL DEVICE.

Application filed January 11, 1921. Serial No. 436,486.

*To all whom it may concern:*

Be it known that I, ARTHUR M. ECHTERNACH, a citizen of the United States, and residing at Seattle, in the county of King and State of Washington, have invented certain new and useful Improvements in Automatic Speed-Signal Devices, of which the following is a specification.

This invention relates to an automatic speed indicator for vehicles wherein visual or audible alarms are operated at predetermined vehicle speeds, so that both the driver and any other interested party may know with more or less accuracy the speed at which the particular vehicle is traveling.

The invention is directly controlled by the speedometer and the operative parts of the invention may be set in any one or more, preferably three, predetermined speeds, so that when the machine is traveling and the speedometer indicates the particular speed or speeds for which the device is set, the alarm or alarms will be automatically operated to indicate the fact of such predetermined speed or speeds.

The device in the preferred form is arranged with visual signals, for instance, three in number, the first of which will indicate a minimum predetermined speed, the second of which an intermediate predetermined speed, and the third of which will indicate a maximum predetermined speed. This form of the device is operated electrically so that as the vehicle travels through the successive predetermined speeds, the alarms will be operated in succession to indicate such speeds.

A modified form of the device is operated mechanically to sound an audible alarm or alarms with exactly the same result as that described in connection with the visual alarms.

In the drawings:—

Fig. 2 is a view illustrating more or less diagrammatically the preferred form of the invention.

Fig. 3 is a broken rear elevation of a vehicle showing the rear signal box applied thereto.

Fig. 4 is a sectional view showing the arrangement of the contacts in the speedometer.

Fig. 5 is an enlarged horizontal section through the rear signal.

Fig. 6 is a vertical section through the same.

Figure 1:
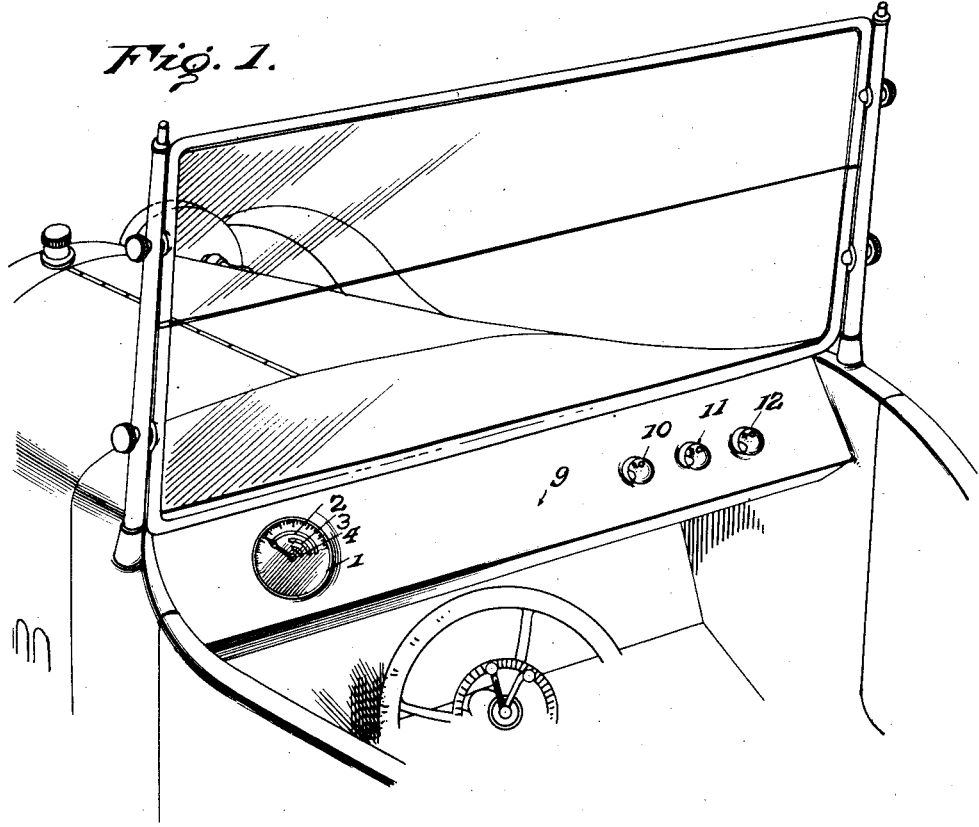
Fig. 1 is a broken perspective view illustrating the application of the invention to a dash board of a vehicle.
Figure 10:
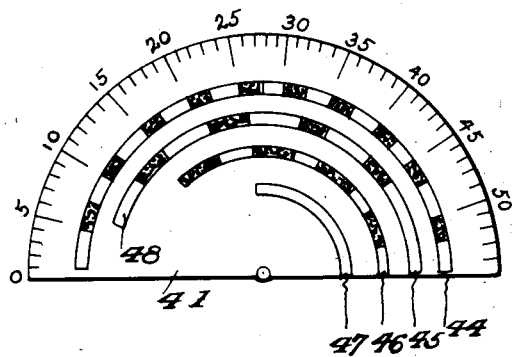
Fig. 10 is a plan showing an arrangement of contact strips to indicate substantially all speeds between certain limits.
Figure 11:
Fig. 11 is an edge view of one of such strips to indicate the non-contacting portion thereof.
Figure 7:
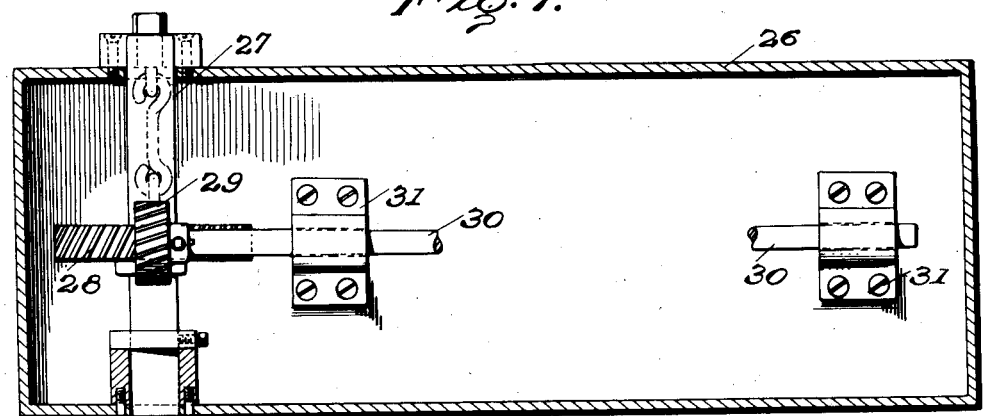
Fig. 7 is a view in elevation partly in section of a modified form of device.
Figure 8:
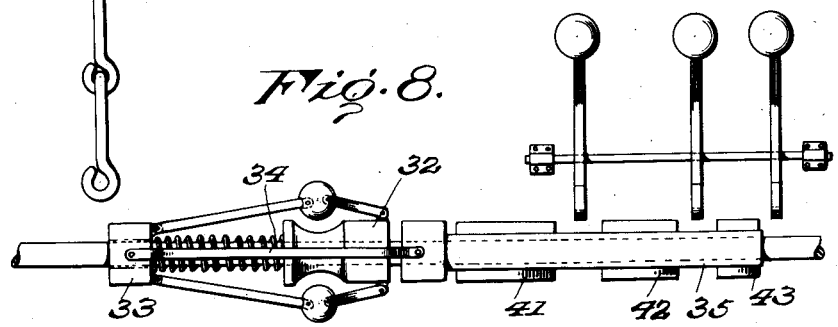
Fig. 8 is an elevation of the actuating means used in such modified form.
Figure 9:
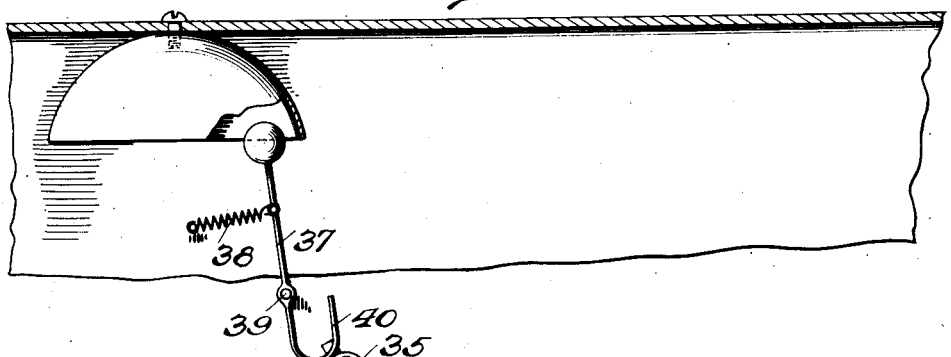
Fig. 9 is an elevation of a signal member used with the modified form.

In carrying out the detail of the invention in connection with the preferred form as illustrated in Figs. 1 to 6 inclusive, the speedometer dial 1 is provided with concentric spaced strip-like contacts 2, 3, and 4. These contacts which are insulated from the dial are arranged in concentric spaced relation and while their relative lengths may be such as described in accordance with the signalling limits of the device, they are shown in the present instance as aligning respectively at their entrant ends with lines radial of the disc and coinciding with the 20, 30 and 40 mile mark on such disc. The opposite or remote ends of the contact strips terminate in a line radial of the disc and coincide with the maximum mileage indication of the disc. The speedometer pointer 5 which is insulated from the disc, is provided with contacts 6, 7, and 8, which in the speedometer operation of the pointer engage respectively with the strips 2, 3, and 4.

On the dash 9 of the vehicle are, in the particular arrangement being described, secured in any appropriate manner three electric lights 10, 11, and 12, which may be differently colored or which may be marked to indicate the initial mileage indication of the strips 2, 3 and 4 respectively. A rear signal casing 13 is mounted at an appropriate point on the rear of the vehicle and is provided with an offset having the tail light 14 therein and with a horizontal portion having electric lights 15, 16 and 17 marked in correspondence with the dash lights to indicate the initial mileage indication of the strips 2, 3 and 4. That is to say, each strip controls a light on the